(12) United States Patent
Salam et al.

(10) Patent No.: US 8,498,614 B1
(45) Date of Patent: Jul. 30, 2013

(54) SYSTEM AND METHOD FOR WIRELESS TRANSMISSION SECURITY

(75) Inventors: Khan Salam, Cedar Rapids, IA (US); Jerzy Richter, Cedar Rapids, IA (US); Donald F. Hovda, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 199 days.

(21) Appl. No.: 13/192,877

(22) Filed: Jul. 28, 2011

(51) Int. Cl.
*H04M 1/66* (2006.01)

(52) U.S. Cl.
USPC ....... 455/410; 455/556.1; 455/557; 455/66.1; 455/344

(58) Field of Classification Search
USPC .................. 455/410, 411, 414.1, 422.1, 41.2, 455/517, 703, 556.1, 557, 575.6, 575.7, 66.1, 455/344
See application file for complete search history.

(56) References Cited

U.S. PATENT DOCUMENTS

| | | | | |
|---|---|---|---|---|
| 3,917,907 | A * | 11/1975 | Bartelink | 370/282 |
| 6,611,507 | B1 * | 8/2003 | Hottinen et al. | 370/331 |
| 7,111,102 | B2 * | 9/2006 | Doak et al. | 710/305 |
| 7,310,695 | B2 * | 12/2007 | Epps et al. | 710/305 |
| 2002/0045836 | A1 * | 4/2002 | Alkawwas | 600/509 |
| 2003/0078572 | A1 * | 4/2003 | Pearson et al. | 606/34 |
| 2004/0177128 | A1 * | 9/2004 | Northway | 709/217 |
| 2005/0083856 | A1 * | 4/2005 | Morelli et al. | 370/254 |
| 2008/0075103 | A1 * | 3/2008 | Noble et al. | 370/429 |
| 2009/0033444 | A1 * | 2/2009 | Kwiatkowski et al. | 333/262 |
| 2009/0160607 | A1 * | 6/2009 | Edwards et al. | 340/5.61 |
| 2009/0239468 | A1 * | 9/2009 | He et al. | 455/41.2 |
| 2009/0278993 | A1 * | 11/2009 | Nishikawa et al. | 348/723 |
| 2010/0067429 | A1 * | 3/2010 | Tsuruoka et al. | 370/315 |
| 2011/0085618 | A1 * | 4/2011 | Zhuang et al. | 375/296 |
| 2012/0135681 | A1 * | 5/2012 | Adams et al. | 455/41.1 |
| 2012/0328041 | A1 * | 12/2012 | Chen et al. | 375/285 |
| 2013/0003658 | A1 * | 1/2013 | Stewart et al. | 370/328 |

* cited by examiner

*Primary Examiner* — Dominic E Rego
(74) *Attorney, Agent, or Firm* — Donna P. Suchy; Daniel M. Barbieri (57) ABSTRACT

A wireless transmission security apparatus includes a wireless device (WD) adaptor, wherein the WD adaptor is configured to contain a portion of radio frequency (RF) radiation emanating from an antenna of an associated wireless communication device, wherein the WD adaptor is selectively communicatively couplable to the wireless communication device at a selected antenna coupling point of the wireless communication device, and a base transceiver station (BTS) adaptor, wherein the WD adaptor and the BTS adaptor are communicatively coupled via uplink and downlink signals, wherein the frequency of the uplink signal is different from a frequency of a native RF uplink signal emanating from the wireless communication device and the downlink signal is different from a frequency of a native RF downlink signal emanating from the BTS.

24 Claims, 10 Drawing Sheets

SYSTEM AND METHOD FOR WIRELESS TRANSMISSION SECURITY

TECHNICAL FIELD

The present invention generally relates to communication networks, and more particularly to a system and method capable of circumventing signal jamming efforts via a frequency conversion process of the uplink and downlink signals between uplink and downlink nodes of the network.

BACKGROUND

As the use of consumer based wireless voice and data devices becomes ubiquitous and the need for voice and data capabilities in tactical settings grows, it is desirable to integrate domestically produced wireless device technology into secure data/voice transmission networks suitable for implementation in a tactical environment. In one sense, the utilization of domestically produced wireless devices, such as smartphones, tablets, and PDAs, represents a cost savings advantage as users requiring heightened security levels (e.g., soldiers in tactical environment) may implement devices already purchased for non-secure environments (e.g., garrison setting). One downfall associated with domestically produce wireless devices is that they generally operate over limited bandwidths, often less than 100 MHz, while also operating at fixed frequencies of approximately 1 to 3 GHz. As result of this lack of flexibility, the implementation of relatively inexpensive jamming equipment may disrupt signals transmitted via 2G, 3G, 4G, Wi-Fi, and GPS protocols. It would therefore be desirable to provide a system and method allowing for the use of domestically produced wireless devices in tactical environments by circumventing these jamming and data interception techniques.

SUMMARY

An apparatus for wireless transmission security is disclosed. In one aspect, the apparatus may include, but is not limited to, at least one wireless device (WD) adaptor, wherein the WD adaptor is configured to contain at least a portion of radio frequency (RF) radiation emanating from an antenna of an associated wireless communication device, wherein the WD adaptor is selectively communicatively couplable to the wireless communication device at a selected coupling point of the wireless communication device, wherein the antenna coupling point is located within a volume bounded by an outer surface of the wireless device adaptor; and a base transceiver station (BTS) adaptor of a base transceiver station, wherein the at least one WD adaptor and the BTS adaptor are communicatively coupled via an uplink signal and a downlink signal, wherein the frequency of the uplink signal is different from a frequency of a native RF uplink signal emanating from the wireless communication device and the downlink signal is different from a frequency of a native RF downlink signal emanating from the BTS, wherein the at least one WD adaptor is configured to convert the native RF uplink signal to the uplink signal, wherein the BTS adaptor is configured to convert the native RF downlink signal to the downlink signal.

In another aspect, the apparatus may include, but is not limited to, at least one wireless device (WD) adaptor, wherein the wireless adaptor includes a signal containment module and a signal processing module, wherein the signal containment module is housed in a first housing unit and the RF processing module is housed in a second housing unit, wherein the signal containment module and the RF processing module are communicatively coupled via a wireline connection, wherein the signal containment module of the WD adaptor is configured to contain at least a portion of radio frequency (RF) radiation emanating from an antenna of an associated wireless communication device; and a base transceiver station (BTS) adaptor of a base transceiver station, wherein the at least one WD adaptor and the BTS adaptor are communicatively coupled via an uplink signal and a downlink signal, wherein the frequency of the uplink signal is different from a frequency of a native RF uplink signal emanating from the wireless communication device and the downlink signal is different from a frequency of a native RF downlink signal emanating from the BTS, wherein the at least one WD adaptor is configured to convert the native RF uplink signal to the uplink signal, wherein the BTS adaptor is configured to convert the native RF downlink signal to the downlink signal.

A method for wireless transmission security is disclosed. In one aspect, the method may include, but is not limited to, containing at least a portion of a native radio frequency (RF) uplink signal emanating from an antenna of a wireless communication device utilizing a wireless device (WD) adaptor; establishing an uplink signal between the WD adaptor and a base transceiver stations (BTS) adaptor of a base transceiver station, wherein the uplink signal has a frequency different than the native RF uplink signal; and establishing a downlink signal between the BTS adaptor of the BTS and the WD adaptor, wherein the downlink signal has a frequency different than the native RF downlink signal.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention. Reference will now be made in detail to the subject matter disclosed, which is illustrated in the accompanying drawings.

Referring generally to FIGS. 1 through 3B, a system 100 suitable for secure radio frequency (RF) signal transmission between one or more wireless devices 104 and a base transceiver station 106 is described in accordance with present disclosure. The present invention is directed toward a wireless device (WD) adaptor 102 and a base transceiver station (BTS) adaptor 108 capable of producing secure uplink/downlink channels between the WD adaptors 102 and the BTS adaptor 108. The WD adaptor 102 and the BTS adaptor 108 are configured to allow the insertion of domestically produced wireless device technology (e.g., cellular phones or Wi-Fi devices) into a tactical environment by circumventing jamming (e.g., enemy jamming signals or friendly jamming signals) and data interception efforts which may be present in the tactical environment.

Figure 1:
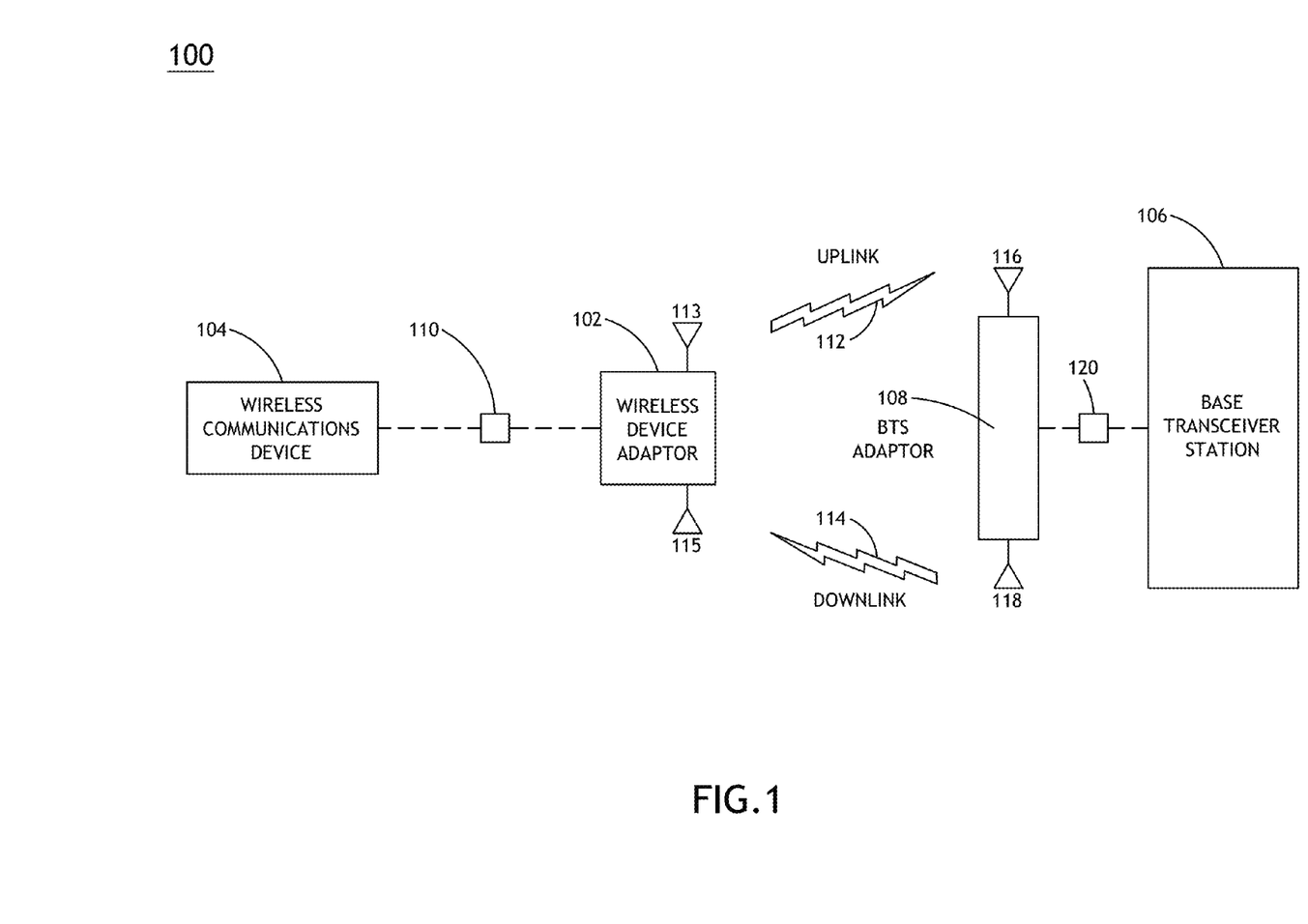
FIG. 1 is a block diagram of a system for secure wireless transmission, in accordance with one embodiment of the present invention.

FIG. 1 illustrates a block diagram of the system 100 suitable for providing secure transmission of a RF signal between one or more mobile wireless devices 104 and a BTS 106. The system 100 may include one or more WD adaptors 102 and one or more BTSs 106 (e.g., picocell), each BTS 106 equipped with at least one BTS adaptor 108. In one aspect, each WD adaptor 102 of the system 100 is couplable to a wireless communications device 104 (e.g., cellular phone, Wi-Fi enabled device, or a Wi-Max enabled device) and configured to contain the RF radiation emanating from the wireless communications device 104. Moreover, the WD adaptor 102 is selectively communicatively couplable to the wireless communications device 104 at a selected coupling point 110 of the device 104. Similarly, the BTS adaptor 108 is communicatively couplable to the BTS 106 at connection point 120. In another aspect, BTS adaptor 108 of the BTS is communicatively couplable to the WD adaptor 102 via an uplink signal 112 and/or a downlink signal 114. Further, the WD adaptor 102 may convert the native uplink signal emanating from the wireless device 104 to one or more uplink signals 112 having a frequency different than the frequency of the native uplink signal.

As will be discussed in more detail further herein, the signal conversion carried out by the WD adaptor 102 (or the BTS adaptor 108) may include shifting the frequency of a native signal to a single frequency different than the native signal frequency or converting the native frequency via a frequency hopping process to multiple frequencies. The uplink signal 112 may be transmitted to the BTS adaptor 108 via the uplink antenna 113. Further, the converted (e.g., up-converted or down-converted) uplink signal 112 may then be received by the BTS adaptor 108, which in turn may convert (e.g., down-convert or up-convert) the uplink signal 112 to a signal having a frequency consistent with the native frequency of the wireless device 104/BTS 106 system, allowing the BTS adaptor 108 and the BTS 106 to process the information originally carried in the uplink signal 112.

Likewise, the BTS adaptor 108 may convert the native downlink signal of the BTS 106 to a downlink signal 114 having a frequency different than the frequency of the native downlink signal. This downlink signal 114 may then be received by the WD adaptor 102 via the downlink antenna 115. The WD adaptor may in turn convert the downlink signal 114 to a signal having a frequency consistent with the native frequency of the device 104, allowing the device 104 to process the information carried in the downlink signal 114 transmitted by the BTS adaptor 108. By way of example, in the event the system 100 is being implemented to circumvent a Tri-Band/WiFi jammer capable of jamming signals having a native operating frequency between a 1850 MHz to 2.4 GHz, the WD adaptor 102 may up-convert the signal of the wireless device 104 such that the uplink signal 112 has a frequency higher than 2.4 GHz. Moreover, the WD adaptor may alternatively down-convert the signal such that uplink signal 112 has a frequency lower than 1850 MHz. Likewise, the BTS adaptor 108 may up-convert or down-convert the signal emanating from the BTS 106 such that the downlink 114 signal has a frequency outside of the range of 1850 MHz to 2.4 GHz.

It is contemplated herein that the WD adaptor 102 of the present invention may be configured to operate in conjunction with various types of wireless devices 104. The wireless devices 104 may include, but are not limited to, cellular phones (e.g., non-smartphone or smartphone), tablet devices, notebook devices, or laptops. Moreover, the wireless device may include a cellular (e.g., 2G, 2.5G, 3G, or 4G) enabled device or a Wi-Fi enabled device. It is further recognized that the system 100 may be configured to operate with any of the various cellular or Wi-Fi protocols known in the art, such as, but not limited to, CDMA, GSM, WiMax, and the like.

In another aspect of the present invention, as will be discussed in greater detail further herein, a WD adaptor 102 of the system 100 may have an output power that is different than the output power of an associated wireless device 104. Likewise, the BTS adaptor 108 may have an output power that is different than the output power of the associated BTS 106.

Figure 2A:
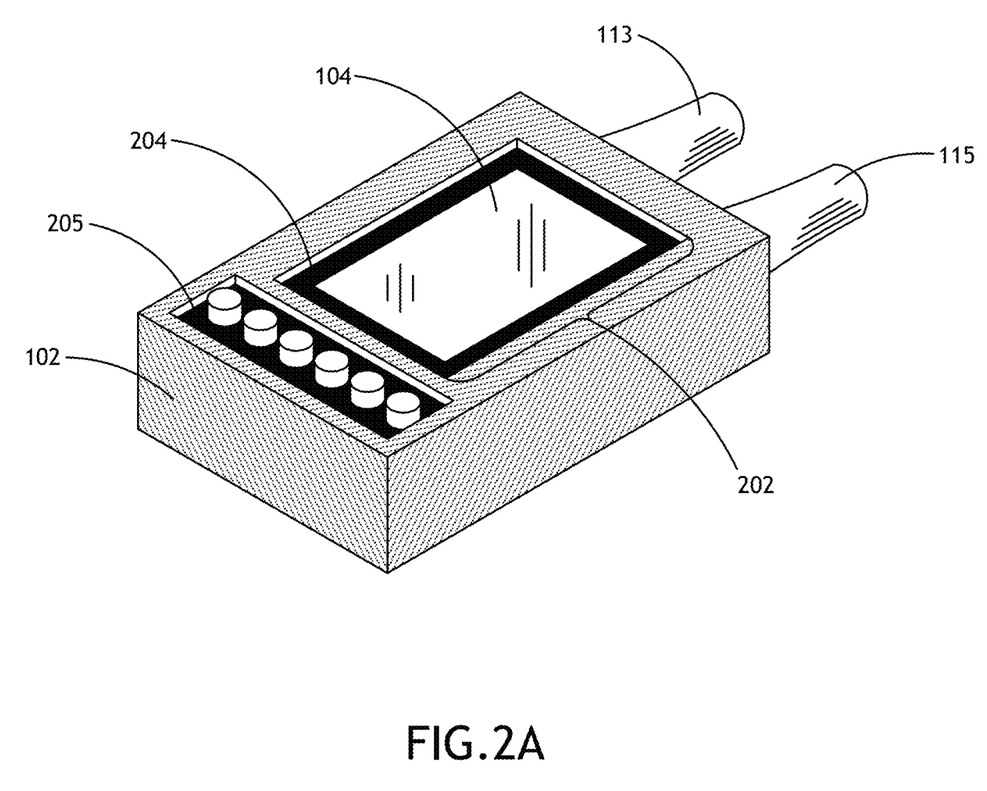
FIG. 2A is a schematic diagram illustrating a wireless device adaptor, in accordance with one embodiment of the present invention.

FIG. 2 illustrates a schematic view of a WD adaptor 102 in accordance with an exemplary embodiment of the present invention. The WD adaptor 102 may be constructed to enclose or at least partially enclose the wireless communications device 104. For example, the WD adaptor 102 may include a recessed portion 202 suitable for partially enclosing the housing 204 of a wireless communications device 104. In this regard, the recessed portion 202 may enclose the wireless device 104 to sufficiently contain the RF radiation emanating from the wireless device 104, while at the same time providing a user access to the user interface (e.g., touch screen, hard buttons, and the like) or the input/output ports (e.g., SD port, mini-USB port, audio port, and the like) of the wireless device 104.

In one embodiment, the adaptor 102 may be detachably coupled to the wireless communications device 104. In this manner, a user may insert a selected wireless communication device 104 into a selected adaptor 102 when heightened signal transmission security is required, and may remove the device 104 when security needs diminish. For example, the recessed portion 202 of the adaptor 102 may be sized such that the housing 204 of the device 104 fits tightly within the recessed portion 202 of the adaptor 102. In this manner, the frictional forces between the internal walls of the recessed portion 202 of the adaptor 102 and the housing 204 of the wireless device 104 may act to secure the wireless device 104 within the adaptor 102. In a further embodiment, the wireless device 104 may be secured within the recessed portion 202 of the adaptor 102 via an adhesive material. In a general sense, any adhesive substance known in the art may be suitable for implementation in the present invention.

In another example, one or more surfaces of the housing 204 of the wireless device 104 and one or more surfaces of the recessed portion 202 of the adaptor may be equipped with one or more mateable fastening pieces, such as hook and loop material (e.g., Velcro) or a mechanical interlocking device (e.g., bolt/nut, male/female clip device, male/female slidable interlocking device and the like). In this manner, the wireless device 104 may be secured within the recessed portion 202 of the adaptor 102 by mating one or more fastening devices disposed on the housing 204 of the wireless device 104 with one or more fastening devices disposed on one or more walls of the recessed portion 202 of the adaptor 102. In a general sense, any fastening device known in the art may be suitable for implementation in the present invention.

In another embodiment, the WD adaptor 102 may include a user interface 205. The user interface 205 may be utilized by the user to input various commands to the WD adaptor 102. In another embodiment, the user may input commands to the WD adaptor 102 via an application (i.e., app) running on the wireless device 104. For example, the WD adaptor 102 and the wireless device 104 may both include Bluetooth modules (not shown). The Bluetooth modules of the WD adaptor 102 and the wireless device 104 may then be selectively communicatively coupled. In this manner, the user may control the WD adaptor 102 utilizing an app running on the wireless device.

In another embodiment of the present invention, the WD adaptor 102 may include an independent power source. For example, the WD adaptor 102 may include a rechargeable battery system which acts to provide power the sub-systems of the WD adaptor 102. In a further embodiment, the WD adaptor 102 may be configured to provide back-up power to the wireless device 104. In this regard, the battery system of the WD adaptor 102 may be selectively electrically coupled to the wireless device so that the WD adaptor 102 may provide supplemental power to the wireless device 104.

Figure 2B:
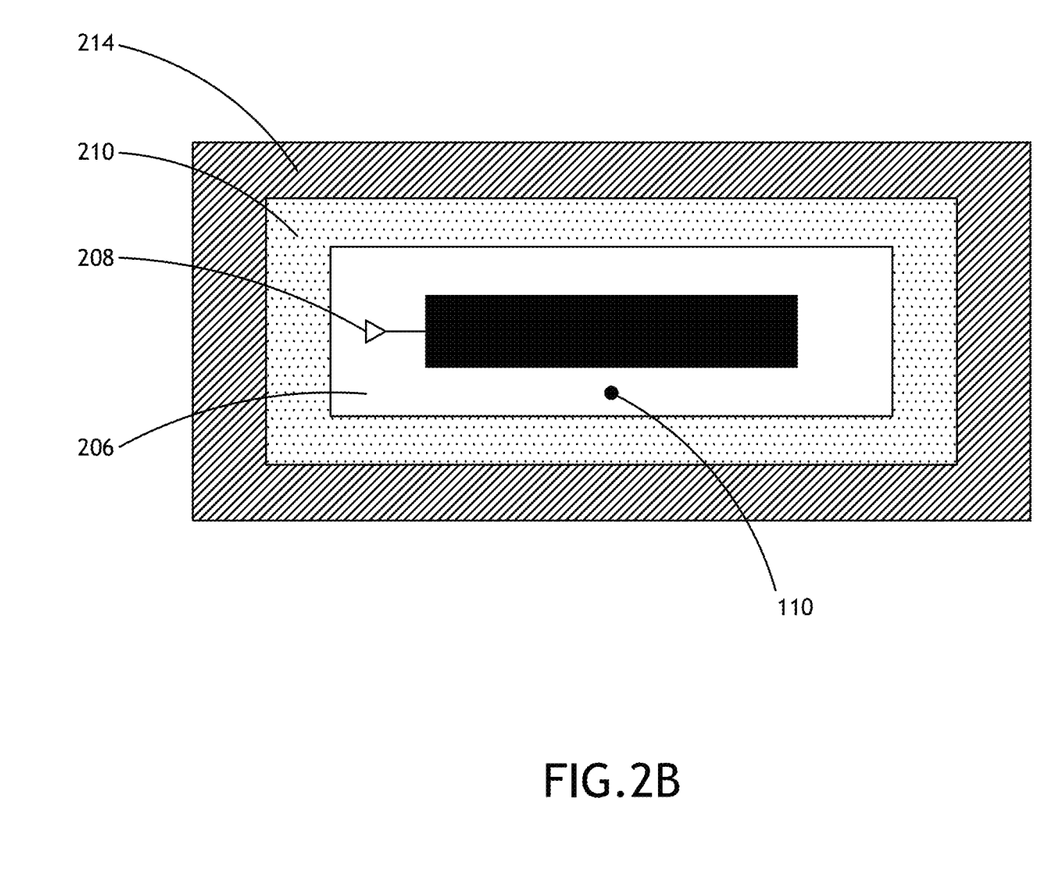
FIG. 2B is a cross-sectional schematic diagram illustrating a wireless device adaptor, in accordance with one embodiment of the present invention.

FIG. 2B illustrates a cross-sectional end view of the adaptor 102 of the system 100. In one embodiment, the adaptor 102 may include a RF absorptive material 206. For example, the adaptor 102 may be constructed at least partially from a RF absorptive material 206. In this manner, the RF absorptive material of the adaptor 102 may act to absorb all or a portion of the RF radiation emanating from the wireless device 104. For instance, a signal emanating from the antenna 208 of the wireless communications device 104 may be completely or partially absorbed by RF absorptive 206 material of the adaptor 102. It should be recognized that a variety of RF absorptive materials are suitable for implementation in the adaptor 102 of the system 100 and any RF absorptive material known in the art may be suitable for implementation in the present invention. For example, an RF absorptive material of the present invention may include, but is not limited to, a ceramic material. For instance, the RF absorptive material of the adaptor 102 may include a ferrite material, such as, but not limited to, NiMn, MgZn, MnZn, or the like.

It is recognized that the amount of attenuation which occurs due to the RF absorptive material 206 is dependent upon a variety of factors. These factors include, but are not limited to, properties of the RF absorptive material (e.g., dielectric permittivity and magnetic permeability), the spatial arrangement of the RF absorptive material, and the frequency of the incident RF radiation.

In another embodiment, the adaptor 102 may include a metallic material 210. For example, the adaptor 102 may be constructed at least partially from a metallic shielding material 210. In this manner, the metallic material 210 of the adaptor 102 may act to reduce the RF signal emanating from the wireless device 104. For instance, a signal emanating from the antenna 208 of the wireless communications device 104 may be completely or partially reduced by metallic shielding material 210 of the adaptor 102. It should be recognized that a variety of metallic shielding materials are suitable for implementation in the adaptor 102 of the system 100 and any metallic shielding material known in the art may be suitable for implementation in the present invention. For example, a metallic shielding material of the present invention may include, but is not limited to, copper, aluminum, or nickel. In a further embodiment, the metallic shielding material 210 of the adaptor may be arranged in various spatial arrangements. For instance, the metallic shielding 210 of the adaptor may be in the form of a metal sheet, a metal screen, or a metal foam. In a general sense, it is anticipate that the metal shielding material 210 may act to reduce the RF signal emanating from the wireless device 104 to very nearly zero, aiding in providing data security for the wireless device 104.

It is further contemplated herein that an exemplary embodiment of the present invention may simultaneously implement a layer of RF absorptive material 206 and a layer of metallic shield material 210. For example, as shown in FIG. 2B, a layer of RF absorptive material 206 may act to attenuate an RF signal emanating from the wireless device 104. Following all or part of the attenuation of the RF signal, the adaptor 102 may couple to the remaining RF signal at the antenna couple point 110. For example, the antenna couple point 110 for a given wireless device 104/adaptor 102 system may reside within a given volume of a RF absorptive material 206 of the adaptor 102. Then, external to the antenna couple point 110, the metallic shielding material 210 may act to reduce the remaining signal to zero or approximately zero amplitude. In utilizing the RF absorbing material 206, the adaptor 102 may be configured to produce an environment allowing for the communicative coupling of the adaptor 102 to the signal emanating from the wireless device 104.

In a further embodiment, the apparatus 102 may include one or more additional layers of material 214 configured to protect the metallic material 210 from chemical and physical degradation. For example, the one or more additional layers 214 of material may include, but is not limited to, a layer of plastic material or a layer of rubber material.

In one aspect of the invention, the adaptor 102 may be coupled to the native signal emanating from the antenna of the wireless device 104 at an antenna coupling point 110 within the volume of the housing of the WD adaptor 102. It should be recognized that the spatial location of the antenna coupling point 110 may depend on a variety of factors. For example, the antenna coupling point 110 may depend on the specific type of wireless device in use. For instance, the position of the antenna coupling point 110 may depend on the frequency of the native signal of the device 104, the power of the native signal of the device 104, and the spatial dependence of the signal as it emanates from the antenna of the device 104. In a general sense, the position of the antenna coupling point 110 will vary from device to device and may be optimizing for each type of wireless device 104 utilized.

Figure 3A:
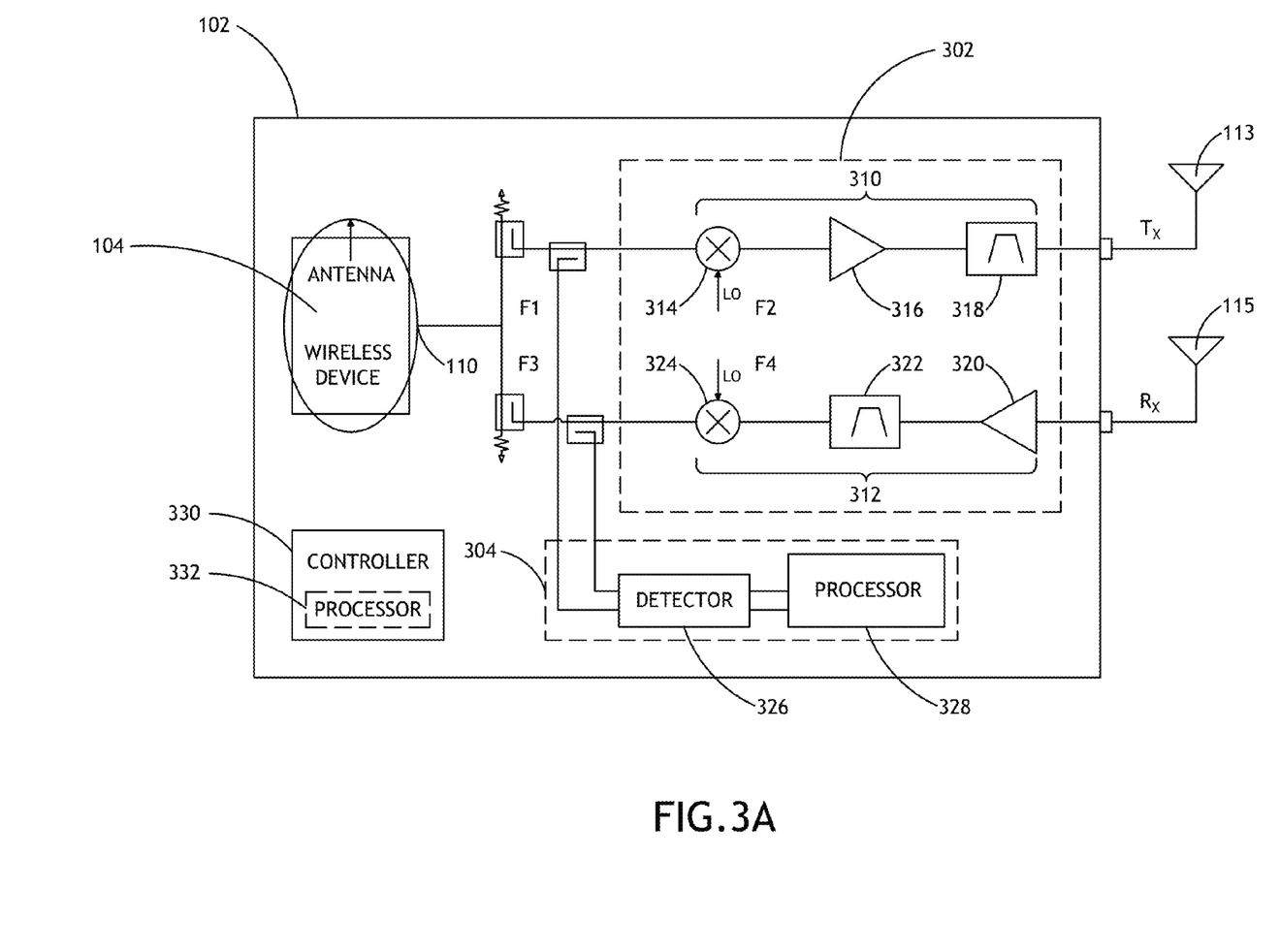
FIG. 3A is a circuit diagram illustrating the circuitry configuration of a wireless device adaptor, in accordance with one embodiment of the present invention.

FIG. 3A illustrates a circuit diagram of an adaptor 102 in accordance with an exemplary embodiment of the present invention. The adaptor 102 may include a RF processing module 302, a signal identification module 304, a RF transmit antenna 113, and a RF receive antenna 115.

The RF processing module 302 of the adaptor 102 may include a transmission path 310 and a receiving path 312. The transmission path 310 may include a mixer 314 having a first input coupled to the output signal of the wireless device 104 and a second input coupled to a local oscillator (LO). In addition, the transmission path 310 may include a power amplifier (PA) 316. The output of the mixer 314 may be coupled to an input of the PA 316, with an output of the PA 316 coupled to the transmitting antenna 113 (i.e., the uplink antenna). In a further embodiment, as shown in FIG. 3A, the transmission path 310 may include a filter 318 (e.g., RF saw filter) coupled to the output of the PA 316 and coupled to the transmitting antenna 113. It should be recognized that a variety of components (e.g., filters) may be placed along the transmission path 310 in order to process the transmitted RF signal. In a general sense, any RF processing circuitry components known in the art may be suitable for implementation in the transmission path 310 of the adaptor 102 of the present invention.

The receiving path 312 may include a low noise amplifier (LNA) 320 having an input coupled to the receiving antenna 115 (i.e., downlink antenna). Further, the receiving path 312 may include a filter 322 (e.g., RF saw filter) having an input coupled to the output of the LNA 320 and an output coupled to a first input of a mixer 324. Moreover, the mixer 324 may have a second input coupled to a local oscillator (LO) and an output coupled to the antenna coupling point 110 of the wireless device 104. It should be recognized that a variety of components may be placed along the receiving path 312 in order to process the received RF signal. In a general sense, any RF processing circuitry components known in the art may be suitable for implementation in the receiving path 312 of the adaptor 102 of the present invention.

The identification module 304 of the adaptor 102 may be configured to identify the type of signal emanating from the wireless device 104. For example, the identification module 304 may be constructed in order to discern between a cellular signal (e.g., 2G, 3G, or 4G) and a Wi-Fi signal. For example, an input of the identification module 304 may be coupled to the signal of the wireless device 104 at the antennal coupling point 110. The identification module 304 may then identify whether the detected signal is a cellular signal or a Wi-Fi signal. In one embodiment, the identification module 304 of the adaptor 102 may include a detector 326 and a processor 328. For example, the detector 326 may be communicatively coupled to the antenna coupling point 110 of the wireless device 104, allowing the detector 326 to detect a portion of the wireless signal emanating from the wireless device 104. For instance, the detector 326 may include a narrow bandpass filter operating in concert with a power detection scheme to identify the type of wireless signal emanating from the wireless device 104.

Further, an output of the detector 326 may be coupled to a processor 328 configured to analyze the detected signal. The processor 328 may execute a pre-programmed algorithm configured to analyze the detector 326 output allowing the identification module 304 to discern between a cellular signal and a Wi-Fi signal. In this sense, the identification scheme may include a frequency selection process which acts to indicate whether an analyzed signal consists of a cellular signal or a Wi-Fi signal. It should be recognized that this process may, in part, be accomplished utilizing a variety of signal filters known in the art. In a general sense, it is recognized that a wide variety of means apparent to those skilled in the art exist for discerning between a cellular signal and Wi-Fi. These means are suitable for implementation in the present invention.

It should be recognized that a variety of additional RF processing components may be included in the context of the present invention. FIG. 3A is simplified in order to highlight components key to the present invention. Additional components placed at various positions within the adaptor 102 should be apparent to those skilled in the art.

It is further contemplated that the type of wireless signal emanating from the wireless device 104 may be keyed into the adaptor 102 manually by the user. In this aspect, the user may utilize the user interface 205 to fix the adaptor mode (e.g., cellular or WiFi). In another aspect, the user may utilize an application (i.e., an app) running on the wireless device 104 to fix the adaptor mode. For example, the adaptor 102 may include a Bluetooth module (not shown). In this regard, in the event the wireless device 104 is also equipped with a Bluetooth module, the wireless device 104 and the adaptor 102 may be communicatively coupled to the adaptor via a bluetooth signal. In this manner, the user may select the adaptor mode via the wireless device 104 interface (e.g., touch screen, voice input, keyboard, or the like).

Figure 3B:
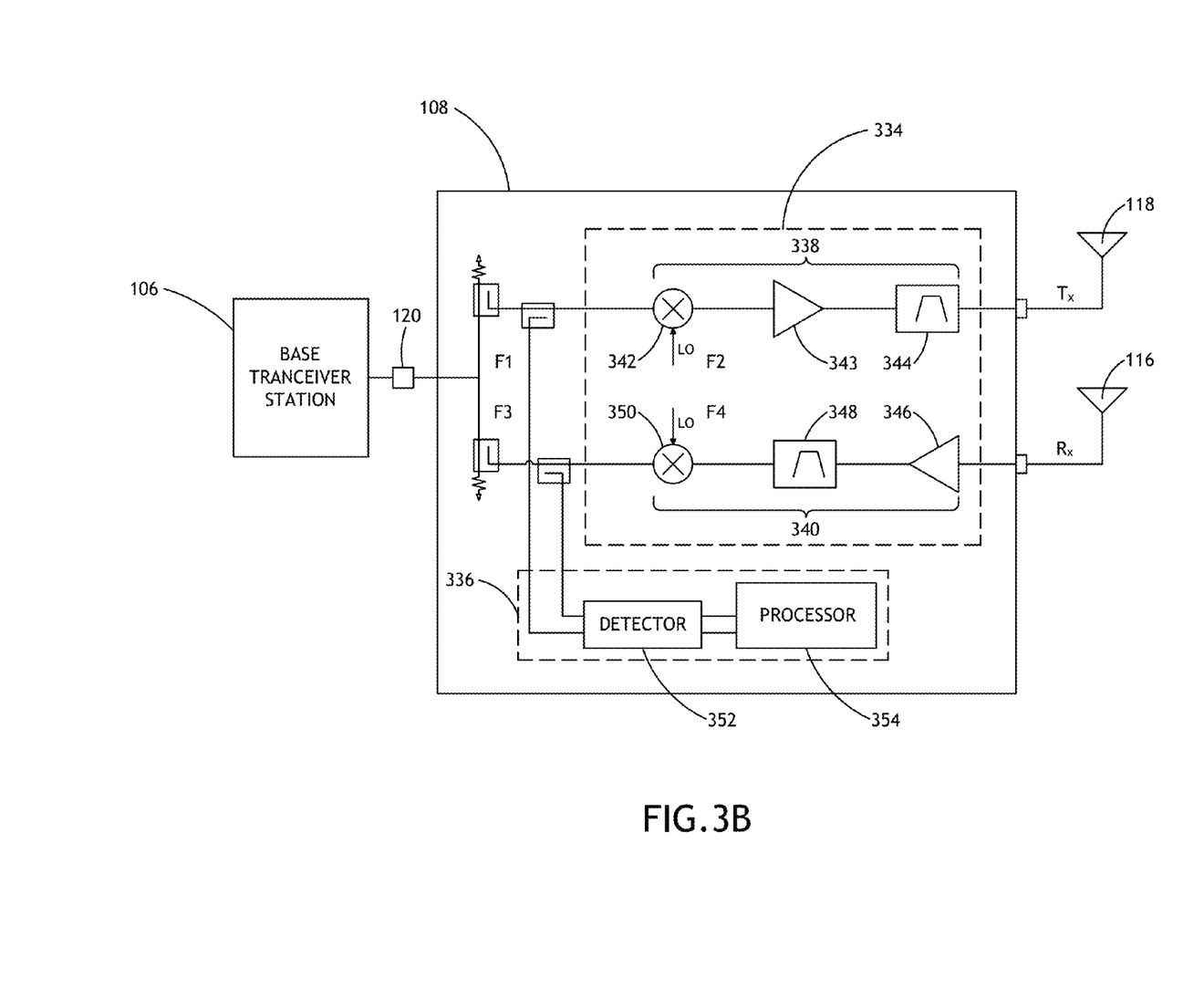
FIG. 3B is a circuit diagram illustrating the circuitry configuration of a BTS adaptor, in accordance with one embodiment of the present invention.

FIG. 3B illustrates a circuit diagram of a BTS adaptor 108 of a BTS 106 of the system 100 in accordance with an exemplary embodiment of the present invention. The BTS adaptor 108 of the BTS 106 may include a RF processing module 334, a signal identification module 336, a RF transmitting antenna 118, and a RF receiving antenna 116.

In one embodiment, the BTS adaptor 108 may be coupled to the native signal emanating from the BTS 106 utilizing an antenna coupling point 120. In this regard the BTS adaptor 108 may be coupled to the output of the BTS 106 in a manner similar to that described with respect to the coupling between adaptor 102 and the wireless device 104 via coupling point 110. For example, in the case of a small BTS 106 (e.g., picocell BTS or microcell BTS), the BTS 106 may be enclosed or partially enclosed by the BTS adaptor 108 such that the native downlink signal transmitted from the BTS 106 is contained within the BTS adaptor 108 surface. As such, the BTS adaptor 108 may be coupled to output of the BTS 106 via a coupling point 120 which is located within the volumetric region bounded by the surface of the BTS adaptor 108.

In another embodiment, the BTS adaptor 108 may be coupled to the native signal emanating from the BTS 106 utilizing a direct line connection. For example, an input of the BTS adaptor 108 may be directly connected to the downlink output the BTS 106 via a wireline.

In one aspect of the BTS adaptor 108, the RF processing module 334 of the adaptor 108 may include a transmission path 338 and a receiving path 340. With respect to the transmission path 338, it is recognized that the transmission path 338 may include a variety of circuitry components suitable for transmitting the downlink signal 114 to the WD adaptor 102. For example, the transmission path 338 may include a mixer 342 having a first input coupled to the output signal of the BTS 106 (i.e., the PA may be coupled to the output of the intermediate frequency (IF) portion of the BTS, which in turn is coupled to the baseband portion of the BTS) and a second input coupled to a local oscillator (LO). In addition, the transmission path 338 may include a power amplifier (PA) 343. The output of the mixer 342 may be coupled to an input of the PA 343, with an output of the PA 343 coupled to the transmitting antenna 118 (i.e., the downlink antenna of the BTS adaptor). In a further embodiment, as shown in FIG. 3B, the transmission path 338 may include a filter 344 coupled to the output of the PA 343 and coupled to the transmitting antenna 118. It should be recognized by those skilled in the art that a variety of configurations may be implemented in order to transmit the downlink signal 114 and convert the native downlink signal emanating from the BTS 106 to a signal having a frequency suitable for utilization by the WD adaptor (i.e., the shifted frequency). In a general sense, any RF processing circuitry components known in the art may be suitable for implementation in the transmission path 338 of the BTS adaptor 108 of the present invention.

In another aspect, the receiving path 340 of the BTS adaptor 108 may include a low noise amplifier (LNA) 346 having an input coupled to the receiving antenna 116 (i.e., uplink antenna of the BTS adaptor). With respect to the receiving path 340, it is recognized that the receiving path 340 may include a variety of circuitry components suitable for receiving the uplink signal 112 from the WD adaptor 102. For example, the receiving path 340 may include a RF filter 348 (e.g., RF saw filter) having an input coupled to the output of the LNA 346 and an output coupled to a first input of a mixer 350. Moreover, the mixer 350 may have a second input coupled to a local oscillator (LO) and an output coupled to the input (e.g., baseband portion of the BTS or the intermediate frequency (IF) portion of the BTS) of the BTS 106. For instance, the output of the mixer 350 may be coupled to the BTS 106 via a wireline connection or via a coupling point 120. It should be recognized by those skilled in the art that a variety of configurations may be implemented in order to receive the uplink signal 112 and convert the uplink signal 112 to a signal having a frequency suitable for utilization by the BTS 106 (i.e., the native frequency of the uplink nodes and downlink nodes of the network operate). In a general sense, any RF processing circuitry components known in the art may be suitable for implementation in the receiving path 340 of the BTS adaptor 108 of the present invention.

In an additional aspect, the identification module 336 of the BTS adaptor 108 may be configured to identify the type of signal emanating from the BTS 106 (or transmitted by a WD adaptor 102 and received by the BTS adaptor 108). For example, the identification module 336 may be constructed in order to discern between a cellular signal (e.g., 2G, 3G, or 4G) and a Wi-Fi signal. For example, an input of the identification module 336 may be coupled to the signal of the BTS at a coupling point 120 or via a direct wireline connection. The identification module 336 may then identify whether the detected signal is a cellular signal or a Wi-Fi signal. In one embodiment, the identification module 336 of the BTS adaptor 108 may include a detector 352 and a processor 354. For example, the detector 352 may be communicatively coupled to the antenna coupling point 120 of the BTS 106, allowing the detector 352 to detect a portion of the signal emanating from the BTS 106. For instance, the detector 352 may include a narrow bandpass filter operating in concert with a power detection scheme to identify the type of wireless signal emanating from the BTS 106.

Further, an output of the detector 352 may be coupled to a processor 354 configured to analyze the detected signal. The processor 354 may execute a pre-programmed algorithm configured to analyze the detector 352 output allowing the identification module 336 to discern between a cellular signal and a Wi-Fi signal. In this sense, the identification scheme may include a frequency selection process which acts to indicate whether an analyzed signal consists of a cellular signal or a Wi-Fi signal. It should be recognized that this process may, in part, be accomplished utilizing a variety of signal filters known in the art. In a general sense, it is recognized that a wide variety of means apparent to those skilled in the art exist for discerning between a cellular signal and Wi-Fi. These means are suitable for implementation in the present invention.

It should be recognized that a variety of additional RF processing components may be included in the context of the present invention. FIG. 3B is simplified in order to highlight components key to the present invention. Additional components placed at various positions within the adaptor 108 should be apparent to those skilled in the art.

The following description relates to the frequency conversion and power amplification schemes implemented by the previously described WD adaptor 102 and BTS adaptor 108 of the system 100.

In one aspect of the present invention, as illustrated in FIG. 3A, the WD adaptor 102 may up-convert the native RF signal contained within the WD adaptor 102 to an uplink signal 112 having a frequency higher than the frequency of the native RF signal emanating from the wireless device 104. While FIG. 3A illustrates circuitry suitable for up-converting the native wireless signal, it is recognized that any known up-converting circuitry configuration may be suitable for implementation in the present invention as should be recognized by those skilled in the art. In another aspect of the present invention, while not shown, the contained native RF signal may be down-converted to an uplink signal 112 having a frequency lower than the frequency of the native RF signal emanating from the wireless device 104. It should be recognized by those skilled in the art that a variety of down-converting circuit configuration may be suitable for down-converting the native signal to an uplink signal 112. In this regard, the adaptor 102 may couple to the native wireless signal at the antenna coupling point 212 and then up-convert or down-convert the signal, creating an uplink signal 112 having a frequency either shifted above or below to original native signal.

In another aspect of the present invention, the BTS adaptor 108 may down-convert the received uplink signal 112 to a signal having a frequency usable by the BTS 106. In this regard, any circuitry known in the art suitable for down-converting RF signals may be suitable for implementation in the BTS adaptor 108 as should be recognized by those skilled in the art. Moreover, it is further contemplated that the BTS adaptor 108 may up-convert the uplink signal 112 when the original uplink signal 112 was down-converted relative to the native frequency of the signal emanating from the wireless device 104.

Moreover, the BTS adaptor 108 may up-convert a native BTS downlink signal to a downlink signal 114 having a frequency usable by WD adaptor 102. In this regard, any circuitry known in the art suitable for up-converting RF signals may be suitable for implementation in the BTS adaptor 108. In an alternative embodiment, it is further contemplated that the BTS adaptor 108 may down-convert native signal of the BTS in scenarios where the WD adaptor 102 may up-convert the downlink signal 114.

Further, as illustrated in FIG. 3A, the WD adaptor 102 may down-convert the downlink signal 114 transmitted by the BTS adaptor 108 and received by the receiving antenna 115 of the WD adaptor 102. In this regard, the WD adaptor 102 may down-convert the downlink signal 114 to a signal having a frequency suitable for utilization by the wireless device 104 (i.e., a signal having a frequency equal to the native frequency of the wireless device 104). While FIG. 3A illustrates circuitry suitable for down-converting the downlink signal 114, it is recognized that any down-converting circuitry configuration may be suitable for implementation in the present invention as should be recognized by those skilled in the art. In another aspect of the present invention, while not shown, the downlink signal 114 may be up-converted to a signal usable by the wireless device 104. For instance, the WD adaptor 102 may up-convert the downlink signal 114 in scenarios where the BTS adaptor 108 down-converts the native signal emanating from the BTS 106. It should be recognized by those skilled in the art that a variety of up-converting circuit configurations may be suitable for up-converting the downlink signal 114. In this regard, the WD adaptor 102 may couple to the downlink signal 114 and then down-convert or up-convert the downlink signal 114, creating signal having a frequency substantially similar to the native frequency of the wireless device 104.

In another aspect of the present invention, the WD adaptor may apply a frequency hopping scheme to the contained native RF signal. In a general sense, frequency hopping involves "hopping" a signal through multiple frequencies. In the case of "slow" hopping, one or more data bits may be transmitted within a single frequency hop. In one embodiment, a simplified hopping sequence may be implemented utilizing a "slow" internal clock based sequence. In another embodiment, the simplified hopping sequence may be implemented utilizing a commercial or military grade GPS chip set (SAASM). In this manner, the frequency hopping sequence may be triggered via the GPS 1 pps signal. In a general sense, an implemented hopping sequence may be configured in advance via the adaptor, configured on-the-fly via user input, or modified with the network of the system 100. In this regard, the WD adaptor 102 and the BTS adaptor 108 may frequency hop the uplink signals 112 and downlink signals 114 transmitted between the WD adaptor 102 and the BTS adaptor 108 through multiple frequencies. The synchronization between the WD adaptor 102 and the BTS adaptor 108 may be carried out in a manner consistent with the description above. In a further embodiment, the frequency hopping scheme carried out via the adaptor may be executed via the controller 330. For example, the controller 330 may include a processor 332 configured to execute a pre-programmed algorithm stored on an associated storage medium.

In another aspect of the present invention, the output power of a WD adaptor 102 may be different than the output power of the associated wireless communication device 104. In this manner, the WD adaptor 102 may amplify the uplink signal 112 (e.g., WiFi signal or cellular signal) to a power level suitable for utilization between the WD adaptor 102 and the BTS adaptor 108. It should be recognized that any suitable power amplification scheme known in the art may be implemented in the context of the present invention.

In one embodiment, the power amplification characteristics of the WD adaptor 102 may depend upon the type of identified signal emanating from the wireless device 104. In one aspect, upon identifying a cellular signal (e.g., 2G, 2.5G, 3G, or 4G) emanating from the wireless device 104 via the identification module 304, the WD adaptor 102 may act to maintain constant gain during signal conversion (e.g., up-converting the native signal of the device to the uplink signal 112). In concert, the network of the system 100 may act to control the power level of the uplink signal 112. In another aspect, the WD adaptor 102 may act to modify the gain during signal conversion. It is should be recognized that the above description is not a limitation but rather should merely be interpreted as an illustration.

In yet another aspect, upon identifying a Wi-Fi signal emanating from the wireless device 104 via the identification module 304, the WD adaptor 102 may control the power level of the uplink signal 112. In this manner, the WD adaptor 102 may adjust the output power of the uplink signal 112 to a power level sufficient to maintain a link with the BTS adaptor 108 of the BTS 106. In a further embodiment, when a WiFi signal is identified as emanating from the wireless device 104, the user may select the output power of the WD adaptor 102 utilizing the user interface 205 of the WD adaptor 102.

In another embodiment, the user may select the output power of the WD adaptor 102 utilizing an application (i.e., app) running on the wireless device 104. In this regard, a Bluetooth module of the wireless device 104 may be communicatively coupled to a Bluetooth module of the WD adaptor 102. In this manner, the user may select the power level of the uplink signal 112 via the wireless device 104 interface (e.g., touch screen, voice input, keyboard, or the like). In a further embodiment, the power level control carried out via the WD adaptor 102 may be executed via the controller 330. For example, the controller 330 may include a processor 332 configured to execute a pre-programmed algorithm stored on an associated storage medium suitable for controlling the power output level of the uplink signal 112.

In another aspect of the present invention, the output power of the BTS adaptor 108 may be different than the output power of the associated base transceiver station. In this manner, the BTS adaptor 108 may amplify the downlink signal 114 (e.g., WiFi signal or cellular signal) to a power level suitable for utilization between the WD adaptor 102 and the BTS adaptor 108. It should be recognized that any suitable power amplification scheme known in the art may be implemented in the context of the present invention.

In one embodiment, the power amplification characteristics of the BTS adaptor 108 of the BTS 106 may depend upon the type of identified signal emanating from the BTS 106. In one aspect, upon identifying a cellular signal emanating from the BTS 106 via the identification module 336 of the BTS adaptor 108, the BTS adaptor 108 may operate in a manner consistent with standard commercial BTS systems (e.g., picocell). In contrast, however, the BTS adaptor 108 may amplify the downlink signal 114 relative to the native BTS signal such that the BTS 106 may operate with the one or more WD adaptors 102 of the system 100. In another aspect, upon identifying a Wi-Fi signal emanating from the BTS 106 via the identification module 336, the BTS adaptor 108 may bypass the BTS base band processor and utilize an independent Wi-Fi processing system of the BTS 106.

Figure 4:
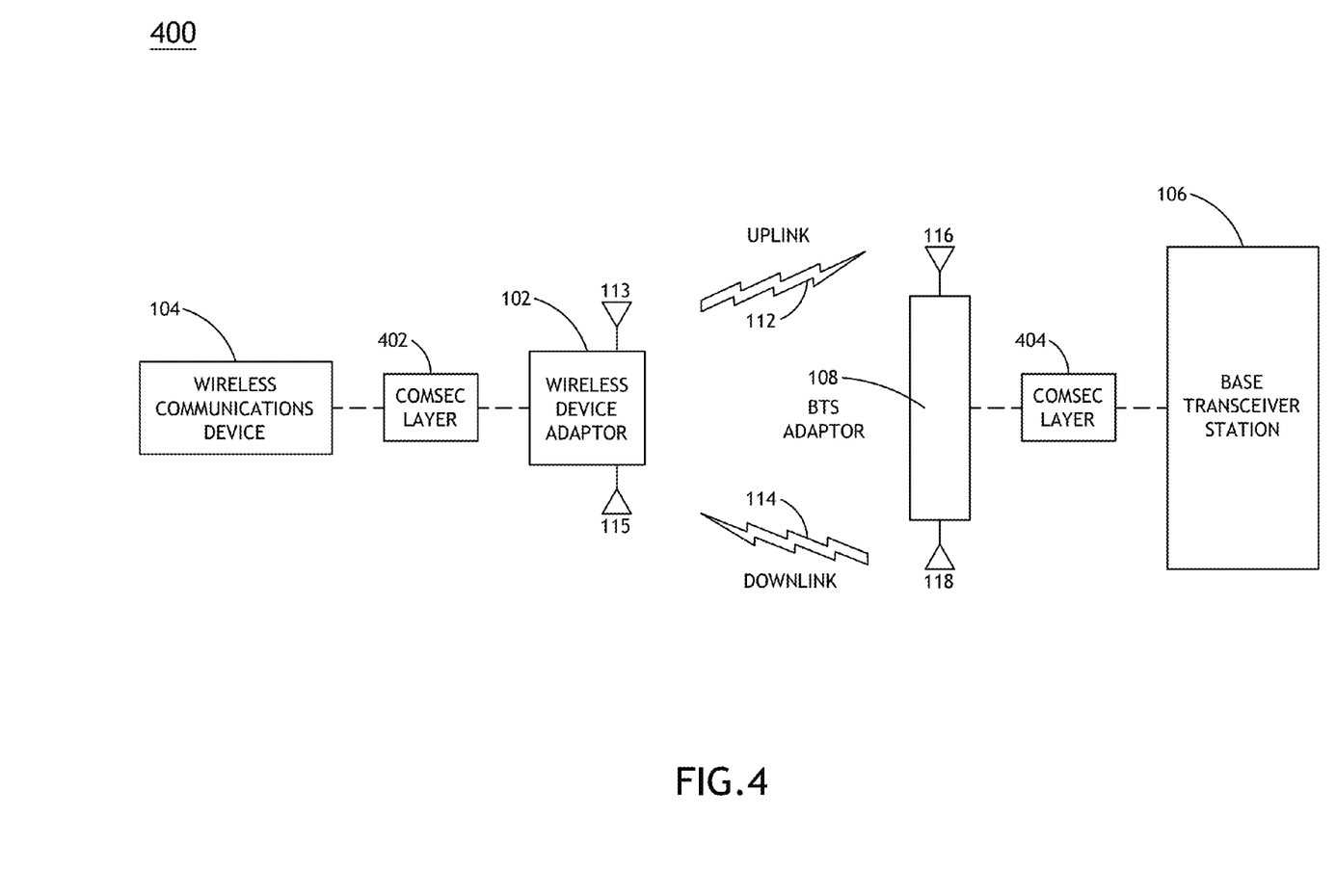
FIG. 4 is a block diagram of a system for secure wireless transmission including a COMSEC layer, in accordance with an alternative embodiment of the present invention.

FIG. 4 illustrates a block diagram of an alternative system 400 suitable for providing secure transmission of a RF signal between one or more mobile wireless devices 104 and a base transceiver station (BTS) 106. In addition to the aspects detailed in the foregoing description, the system 400 may further include a communication security (COMSEC) layer. In this regard, a first portion 402 of the COMSEC layer may act to secure communications emanating from the wireless device 104, while a second portion 404 of the COMSEC layer may act to secure communications emanating from the BTS 106. For example, the COMSEC layer includes the ability to encrypt and unencrypt uplink and downlink signals transmitted between the WD adaptor 102 and the BTS adaptor 108. It should be recognized that any known system and method suitable for implementing COMSEC capabilities may be implemented in the context of the present invention.

Figure 5:
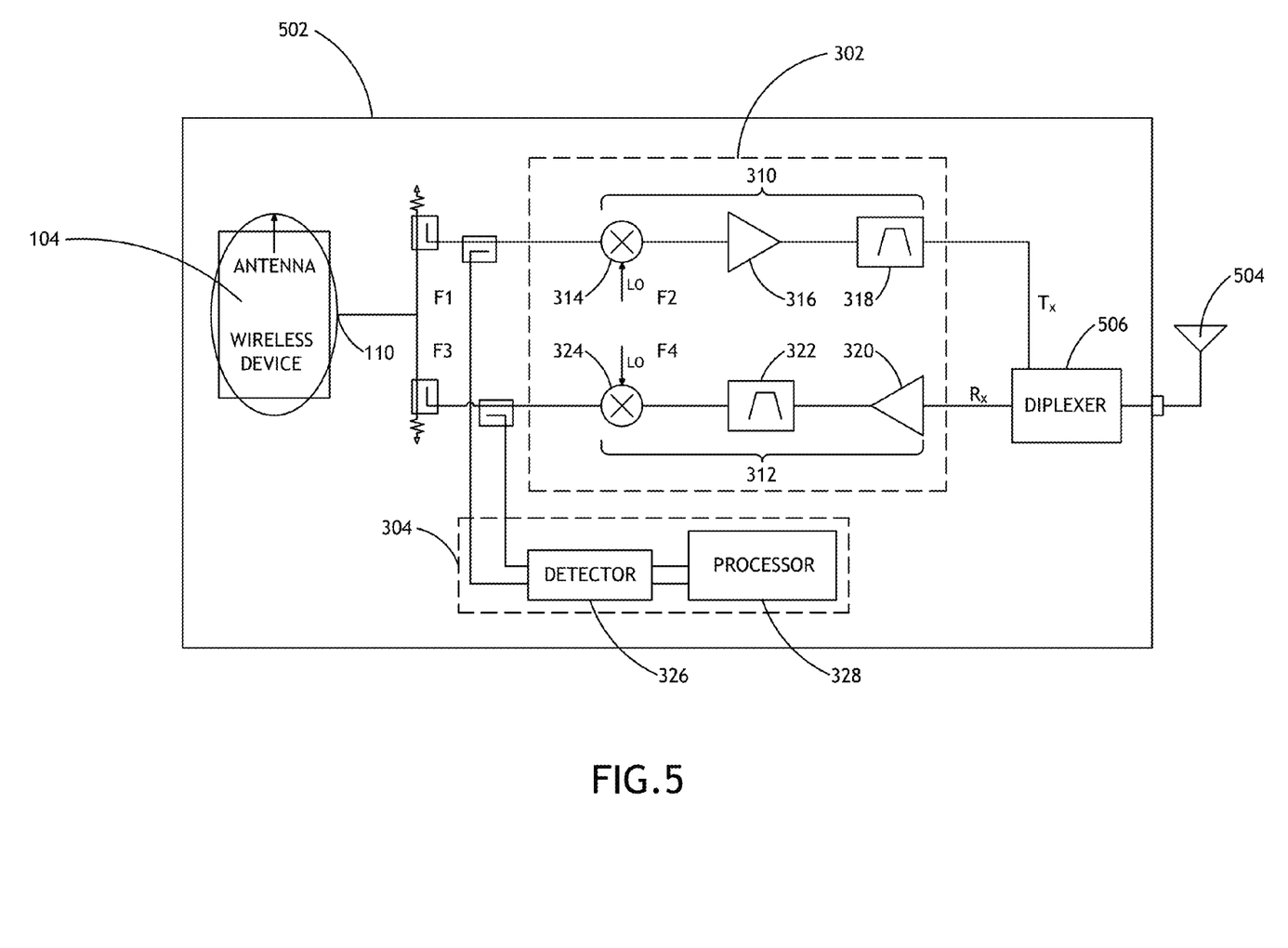
FIG. 5 is a circuit diagram illustrating the circuitry configuration of a wireless device adaptor equipped with a single antenna, in accordance with an alternative embodiment of the present invention.
Figure 6:
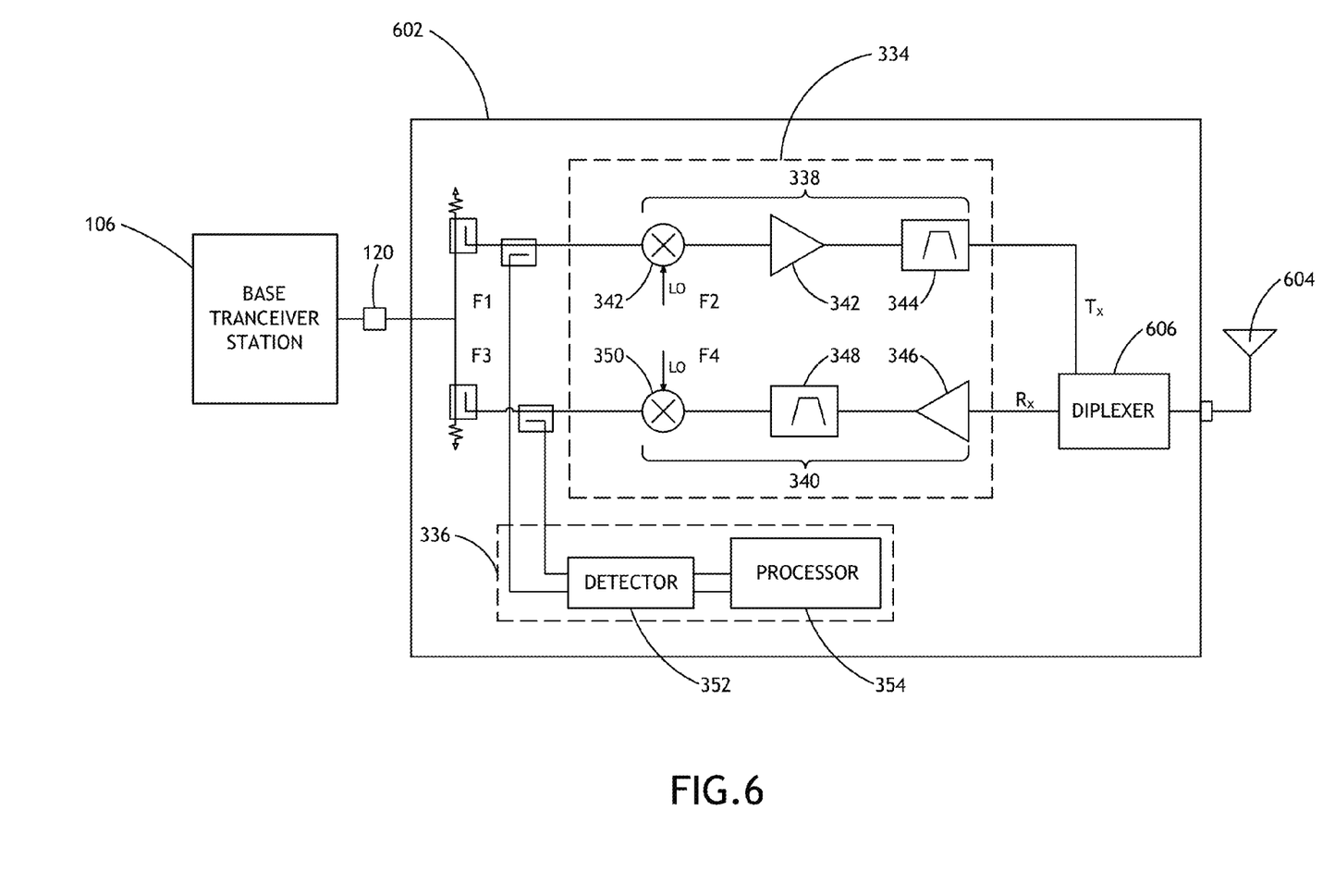
FIG. 6 is a circuit diagram illustrating the circuitry configuration of a BTS adaptor equipped with a single antenna, in accordance with an alternative embodiment of the present invention.

FIGS. 5 and 6 illustrate circuit diagrams representing alternative single antenna designs of the WD adaptor 102 and BTS adaptor 108 of the present invention. FIG. 5 depicts a WD adaptor 502 equipped with a single antenna 504 configured to both transmit and receive RF signals to and from an associated BTS adaptor 108. In one aspect, the single antenna 504 of the single antennal adaptor 502 may be communicatively coupled to a diplexer 506 of WD adaptor 502. The diplexer 506 may act to split the transmission path 310 and the receiving path 312. In a general sense, any diplexer 506 known in the art may be suitable for implementation in the present invention. Similarly, FIG. 6 depicts a BTS adaptor 602 also equipped with a single antenna-diplexer combination. In one aspect, the single antenna 604 may be communicatively coupled to a diplexer 606 of the BTS adaptor 602. The diplexer 606 may act to split the transmission path 334 and the receiving path 340. In a general sense, any diplexer 606 known in the art may be suitable for implementation in the present invention. It should further be recognized that the previously provided description of the embodiments of FIGS. 1 through 4, where appropriate, should be interpreted to apply to FIGS. 5 and 6.

Figure 7:
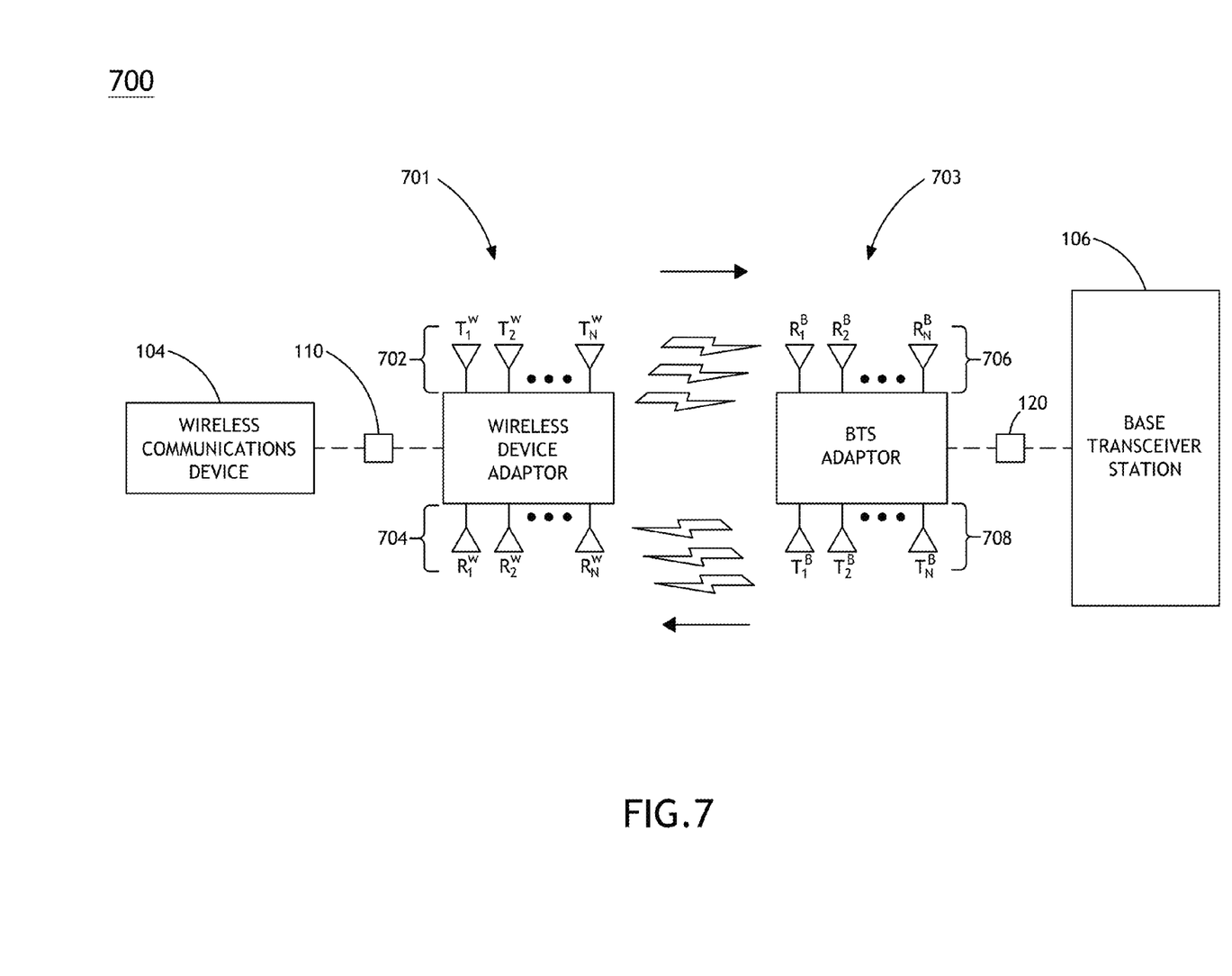
FIG. 7 is a block diagram of a system for secure wireless transmission including a wireless device adaptor and BTS adaptor each equipped with three or more antennas, in accordance with an alternative embodiment of the present invention.

FIG. 7 illustrates a block diagram representing an alternative multiple-antenna design 700 of the WD adaptor 102 and the BTS adaptor 108 of the present invention. In one aspect, both the WD adaptor 701 and the BTS adaptor 703 may include multiple antennas. In one embodiment, the WD adaptor 701 may include multiple transmitting antennas 702 and multiple receiving antennas 704. In another embodiment, the BTS adaptor 703 may include multiple transmitting antennas 708 and multiple receiving antennas 706. For example, the WD adaptor 701 may include the set of transmitting antennas 702 including: a first antenna $T^W_1$, a second antenna $T^W_2$, and up to and including an Nth antenna $T^W_N$ and the set of receiving antennas 704 including: a first antenna $R^W_1$, a second antenna $R^W_2$, and up to and including an Nth antenna $R^W_N$. Moreover, the BTS adaptor 703 may include the set of receiving antennas 706 including: a first antenna $R^B_1$, a second antenna $R^B_2$, and up to and including an Nth antenna $R^B_N$ and the set of transmitting antennas 708 including a first antenna $T^B_1$, a second antenna $T^B_2$, and up to and including an Nth antenna $T^B_N$. It should be recognized by those skilled in the art that the multiple antennas of the WD adaptor 701 and the BTS adaptor 703 of the present invention may be configured to operate in a multiple input/multiple output (MIMO) architecture.

Figure 8:
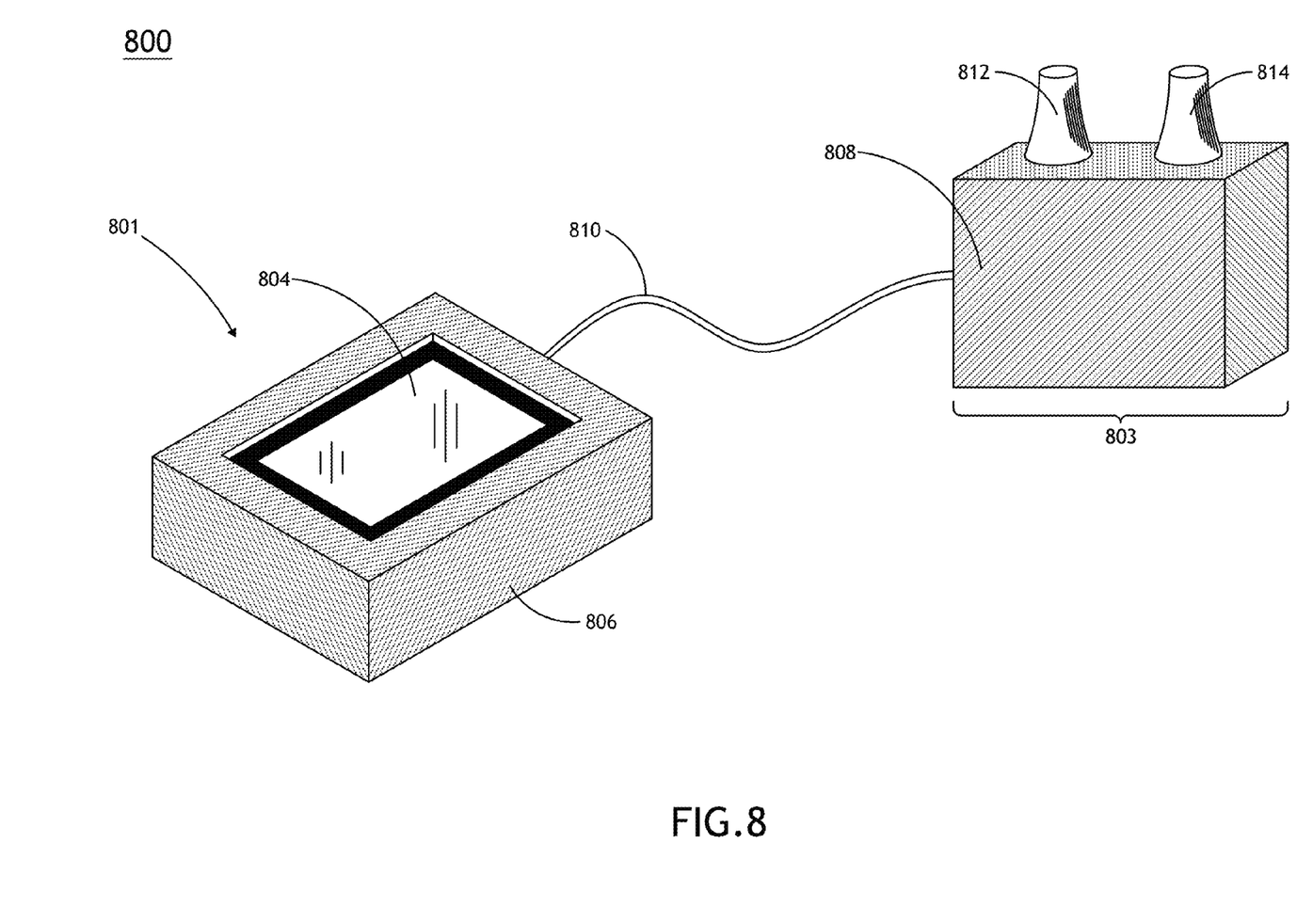
FIG. 8 is a schematic diagram illustrating a wireless device adaptor, in accordance with an alternative embodiment of the present invention.

FIG. 8 illustrates a schematic view of an alternative embodiment of the WD adaptor 102 of the present invention. In the alternative embodiment of FIG. 8, the WD adaptor 800 may include a signal containment module 801 spatially separated from a signal processing module 803. In one aspect, the components (e.g., RF shielding) of the signal containment module may be enclosed within a first housing unit 806, while the components (e.g., RF processing components or signal identification components) of the signal processing module 801 may be contained within a second housing unit 808.

In another aspect of the alternative embodiment illustrated in FIG. 8, the signal containment module 801 and the signal processing module 803 may be communicatively coupled via a wireline connection, such as a data cable 810. In this manner, a native RF signal emanating from the wireless device 804 may be coupled to the signal processing module 803. Moreover, the wireline connection may be made at an antenna coupling point (not shown) within the signal containment module in a manner similar to the antenna coupling point 110 of WD adaptor 102 previously described herein.

In one embodiment, the signal containment module 801 and the signal processing module 803 may be arranged such that the signal processing module 803 is carried on the person of a user. For example, the signal processing module 803 may be stowed in a user's rucksack with a wireline connection connecting the signal processing module 803 and the signal containment module 801, wherein the user interacts with the signal containment module 801 of the adaptor 800. In a general sense, it should be recognized that the signal processing module 803 may be carried on the person of a user in a variety of manners. For instance, the signal processing module 803 may be stowed in a rucksack, a fanny back, or in a pocket of the user's clothing. The above description related to the stowing of the signal processing module 803 should not be considered limiting but rather should be interpreted as illustrative.

In a further aspect, the signal processing module 803 may include, but is not limited to, a RF processing module and an identification module (not shown). For the purposes of the instant disclosure the RF processing module and the identification module of the signal processing module 803 of the WD adaptor 800 are similar to the RF processing modules (e.g., 302) and identification module (e.g., 304) described previously herein. As such, the description related to the RF processing module 302 and the identification module 304 should be interpreted to extend to the WD adaptor 800.

Additionally, the signal containment module 801 may, in part, be constructed from a RF absorptive material and/or a metallic material. It should be recognized that in a general sense the RF absorptive qualities of the signal containment module 801 are similar to the RF absorptive qualities of the WD adaptor 102 described previously herein. As such, the description of FIGS. 1, 2A, and 2B it pertains to RF absorption and shield characteristics should be interpreted to extend to the subject matter described herein.

In one embodiment, the signal processing module may include, but is not limited to, a transmitting antenna 812 and a receiving antenna 814. In this manner, the RF processing module of the signal processing module may upconvert (or downconvert) the native RF signal of the wireless device 804 and transmit the upconverted signal via an uplink channel to an associated BTS adaptor (e.g., BTS adaptor 108). Similarly, the receiving antenna 814 may receive a downlink signal from an associated BTS adaptor (e.g., 108) and downconvert (or upconvert) the received signal to the native signal utilized by the wireless device 804. It should be recognized that this process is nearly identical to the process previously described with respect to WD adaptor 102 and BTS adaptor 108 previously described herein. As such, the description of the signal transmission, reception, and conversion between the WD adaptor 102 and the BTS adaptor 108 should be interpreted to extend to the WD adaptor 800 of the present disclosure. Moreover, the previously provided description of single antenna and multiple antenna alternative embodiments of the WD adaptor illustrated in FIGS. 5 through 7 should be interpreted to extend to the WD adaptor 800.

All of the system and methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

Furthermore, it is to be understood that the invention is defined by the appended claims.

What is claimed:

1. An apparatus for wireless transmission security, comprising:
    at least one wireless device (WD) adaptor, wherein the WD adaptor is configured to contain at least a portion of radio frequency (RF) radiation emanating from an antenna of an associated wireless communication device, wherein the WD adaptor is selectively communicatively couplable to the wireless communication device at a selected coupling point of the wireless communication device, wherein the antenna coupling point is located within a volume bounded by an outer surface of the wireless device adaptor; and
    a base transceiver station (BTS) adaptor of a base transceiver station, wherein the at least one WD adaptor and the BTS adaptor are communicatively coupled via an uplink signal and a downlink signal, wherein the frequency of the uplink signal is different from a frequency of a native RF uplink signal emanating from the wireless communication device and the downlink signal is different from a frequency of a native RF downlink signal emanating from the BTS, wherein the at least one WD adaptor is configured to convert the native RF uplink signal to the uplink signal, wherein the BTS adaptor is configured to convert the native RF downlink signal to the downlink signal.

2. The apparatus of claim 1, wherein an output power of the at least one WD adaptor is different than an output power of the associated wireless communication device.

3. The apparatus of claim 1, wherein an output power of the BTS adaptor is different than an output power of the base transceiver station.

4. The apparatus of claim 1, wherein the at least one WD adaptor is detachably couplable to the associated wireless communications device.

5. The apparatus of claim 1, wherein the wireless communication device comprises at least one of a cellular device or a Wi-Fi device.

6. The apparatus of claim 1, wherein the wireless communication device comprises at least one of a cellular phone, a smartphone, a personal data assistant (PDA), a tablet, a notebook device, or a laptop.

7. The apparatus of claim 1, wherein the at least one WD adaptor includes a RF processing module including a transmitting path and a receiving path.

8. The apparatus of claim 1, wherein the at least one WD adaptor is configured to at least up-convert or down-convert the native RF uplink signal emanating from the wireless communications device.

9. The apparatus of claim 1, wherein the BTS adaptor is configured to at least down-convert or up-convert the uplink signal emanating from the WD adaptor.

10. The apparatus of claim 1, wherein the BTS adaptor is configured to at least down-convert or up-convert the native RF downlink signal emanating from the BTS.

11. The apparatus of claim 1, wherein the at least one WD adaptor is configured to at least down-convert or up-convert the downlink signal emanating from the BTS adaptor.

12. The apparatus of claim 1, wherein the at least one WD adaptor and the BTS adaptor are configured to implement a frequency hopping process.

13. The apparatus of claim 1, wherein the adaptor includes an identification module configured to identify a type of the native RF uplink signal emanating from the wireless communications device.

14. The apparatus of claim 1, wherein a power level of a cellular uplink signal transmitted by the at least one WD adaptor is controlled by the BTS.

15. The apparatus of claim 1, wherein the at least one WD adaptor is configured to control the output power of a Wi-Fi uplink signal, wherein a native Wi-Fi uplink signal emanating from the wireless communications device is converted to the Wi-Fi uplink signal such that the Wi-Fi uplink signal is amplified relative to the native Wi-Fi uplink signal by a selected amount.

16. The apparatus of claim 15, wherein the selected amount of amplification is selectable by a user via a user interface.

17. The apparatus of claim 1, wherein the at least one WD adaptor is configured to enclose at least a portion of a housing of the wireless communications device such that at least a portion of a user interface of the wireless communications device is accessible to a user.

18. The apparatus of claim 1, wherein the at least one WD adaptor is configured to enclose at least a portion of a housing of the wireless communications device such that at least a portion of the RF radiation emanating from the wireless communications device is contained within an external surface of the at least one WD adaptor.

19. The apparatus of claim 1, wherein the at least one WD adaptor includes at least one of a RF absorptive material or a metallic RF shielding material.

20. The apparatus of claim 1, wherein a position of the antenna coupling point is selected based on one or more characteristics of the wireless communications device.

21. The apparatus of claim 1, wherein the at least one WD adaptor comprises at least one of a single antenna WD adaptor, a double antenna WD adaptor, or a WD adaptor having three or more antennas.

22. The apparatus of claim 1, further comprising:
a communications security (COMSEC) layer configured to provide data security to at least one of the uplink signal or the downlink signal.

23. An apparatus for wireless transmission security, comprising:
at least one wireless device (WD) adaptor, wherein the wireless adaptor includes a signal containment module and a signal processing module, wherein the signal containment module is housed in a first housing unit and the RF processing module is housed in a second housing unit, wherein the signal containment module and the RF processing module are communicatively coupled via a wireline connection, wherein the signal containment module of the WD adaptor is configured to contain at least a portion of radio frequency (RF) radiation emanating from an antenna of an associated wireless communication device; and
a base transceiver station (BTS) adaptor of a base transceiver station, wherein the at least one WD adaptor and the BTS adaptor are communicatively coupled via an uplink signal and a downlink signal, wherein the frequency of the uplink signal is different from a frequency of a native RF uplink signal emanating from the wireless communication device and the downlink signal is different from a frequency of a native RF downlink signal emanating from the BTS, wherein the at least one WD adaptor is configured to convert the native RF uplink signal to the uplink signal, wherein the BTS adaptor is configured to convert the native RF downlink signal to the downlink signal.

24. A method for wireless transmission security, comprising:
containing at least a portion of a native radio frequency (RF) uplink signal emanating from an antenna of a wireless communication device utilizing a wireless device (WD) adaptor;
establishing an uplink signal between the WD adaptor and a base transceiver stations (BTS) adaptor of a base transceiver station, wherein the uplink signal has a frequency different than the native RF uplink signal; and
establishing a downlink signal between the BTS adaptor of the BTS and the WD adaptor, wherein the downlink signal has a frequency different than the native RF downlink signal.

* * * * *